US009189942B2

(12) United States Patent
Roston

(10) Patent No.: US 9,189,942 B2
(45) Date of Patent: Nov. 17, 2015

(54) CHILDCARE TRACKING SYSTEMS AND METHOD

(76) Inventor: Rezia Fatima Begum Roston, Newport Coast, CA (US)

( * ) Notice: Subject to any disclaimer, the term of this patent is extended or adjusted under 35 U.S.C. 154(b) by 1869 days.

(21) Appl. No.: 11/818,321

(22) Filed: Jun. 14, 2007

(65) Prior Publication Data

US 2008/0001704 A1 Jan. 3, 2008

Related U.S. Application Data

(60) Provisional application No. 60/814,460, filed on Jun. 19, 2006.

(51) Int. Cl.

| | |
|---|---|
| ***G06Q 10/10*** | (2012.01) |
| ***G06Q 30/02*** | (2012.01) |
| ***G06Q 10/06*** | (2012.01) |
| ***G06Q 30/06*** | (2012.01) |
| ***G06Q 10/08*** | (2012.01) |
| ***G08B 21/02*** | (2006.01) |

(52) U.S. Cl.
CPC .................................. *G08B 21/0202* (2013.01)

(58) Field of Classification Search
USPC ......... 705/300–500, 14.17, 1.1–912; 340/5.8; 235/487
See application file for complete search history.

(56) References Cited

U.S. PATENT DOCUMENTS

| | | | | |
|---|---|---|---|---|
| 5,423,574 | A * | 6/1995 | Forte-Pathroff | 283/75 |
| 5,978,493 | A * | 11/1999 | Kravitz et al. | 382/115 |
| 7,123,126 | B2 * | 10/2006 | Tanaka et al. | 340/5.2 |
| 7,164,354 | B1 * | 1/2007 | Panzer | 340/539.15 |
| 7,233,240 | B2 * | 6/2007 | Phillips | 340/539.13 |
| 7,365,643 | B1 * | 4/2008 | Cole | 340/539.11 |
| 7,684,548 | B1 * | 3/2010 | Rodkey et al. | 379/88.12 |
| 2004/0145475 | A1 * | 7/2004 | Greenberger | 340/572.1 |
| 2005/0219056 | A1 * | 10/2005 | McHugh et al. | 340/573.4 |
| 2006/0035205 | A1 * | 2/2006 | Dobson et al. | 434/350 |
| 2007/0078908 | A1 * | 4/2007 | Rohatgi et al. | 707/203 |

OTHER PUBLICATIONS

Caring For Our Children (http://nrc.uchsc.edu).*
ProCare (NPL).*

* cited by examiner

*Primary Examiner* — Jonathan Ouellette
(74) *Attorney, Agent, or Firm* — Smell & Wilmer LLP

(57) ABSTRACT

The present invention is directed toward systems and methods of tracking pick-ups, drop-offs, and changes of responsibility for children entering or exiting from a school. The systems and methods incorporate an automated process in which an acknowledgement is created upon entry of a biometric. The acknowledgment must be delivered to the teacher before responsibility for the child is accepted or relinquished.

28 Claims, 4 Drawing Sheets

CHILDCARE TRACKING SYSTEMS AND METHOD

This application claims the benefit of U.S. provisional application No. 60/814,460 filed on Jun. 19, 2006 and incorporated herein by reference in its entirety.

FIELD OF THE INVENTION

The field of the invention is child care systems for schools and pre-schools.

BACKGROUND OF THE INVENTION

Many pre-schools, schools, day care and child care facilities (collectively, hereafter "schools") are required by state or local authorities to track the entrance and exit of children. Most schools simply require parents to manually sign an attendance sheet each time their child is picked up or dropped off at the school. These attendance tracking sheets are generally referred to as 'sign-ins' or 'sign-in sheets'. There are many shortcomings with such sign-ins, however, as parents sometimes forget to sign in or send someone who is not authorized to pickup the child. Parents are also required to document the time that the child is signed in or out and they often write down the wrong time for one reason or the other. This can cause problems in custody issues as well in billing and attendance records. In addition, manual sign-in systems create massive amounts of paper that the schools are required to store for long periods of time.

In order to address some of the problems of manual sign-ins, automated systems have emerged such as ProCare's Childcare Management and Daycare Software and Child Care Management (CCM) software. While automated systems certainly help by eliminating the need to store large amounts of paper, many problems remain. One of the problems with automated systems is that they do not address the situation of parents that forget to sign in or out or simply ignore the attendance process. Moreover, schools may be required by law to visually observe the drop off and pick-up of each individual child.

Up to now, there has been no way to validate the attendance process and ensure a clear chain of custody either by using manual or automated methods.

SUMMARY OF THE INVENTION

The present invention provides methods and systems in which an attendance transaction acknowledgement (hereafter, "acknowledgement") is verified before responsibility (e.g. legal custody) for a child changes from the parent or guardian of the child (i.e. the person checking the child in or out or otherwise relinquishing or accepting responsibility) (collectively, the "guardian") to the school and vice-versa. The acknowledgment is generally created in response to the capture of a biometric of the guardian. A teacher can then check the acknowledgment to verify that the parent has not forgotten to, or omitted to, sign the attendance sheet. By providing this system, a face-to-face teacher/parent interaction must occur upon a change in responsibility for the child. Moreover, a document (the acknowledgment) serves to document the hand-over of the child.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
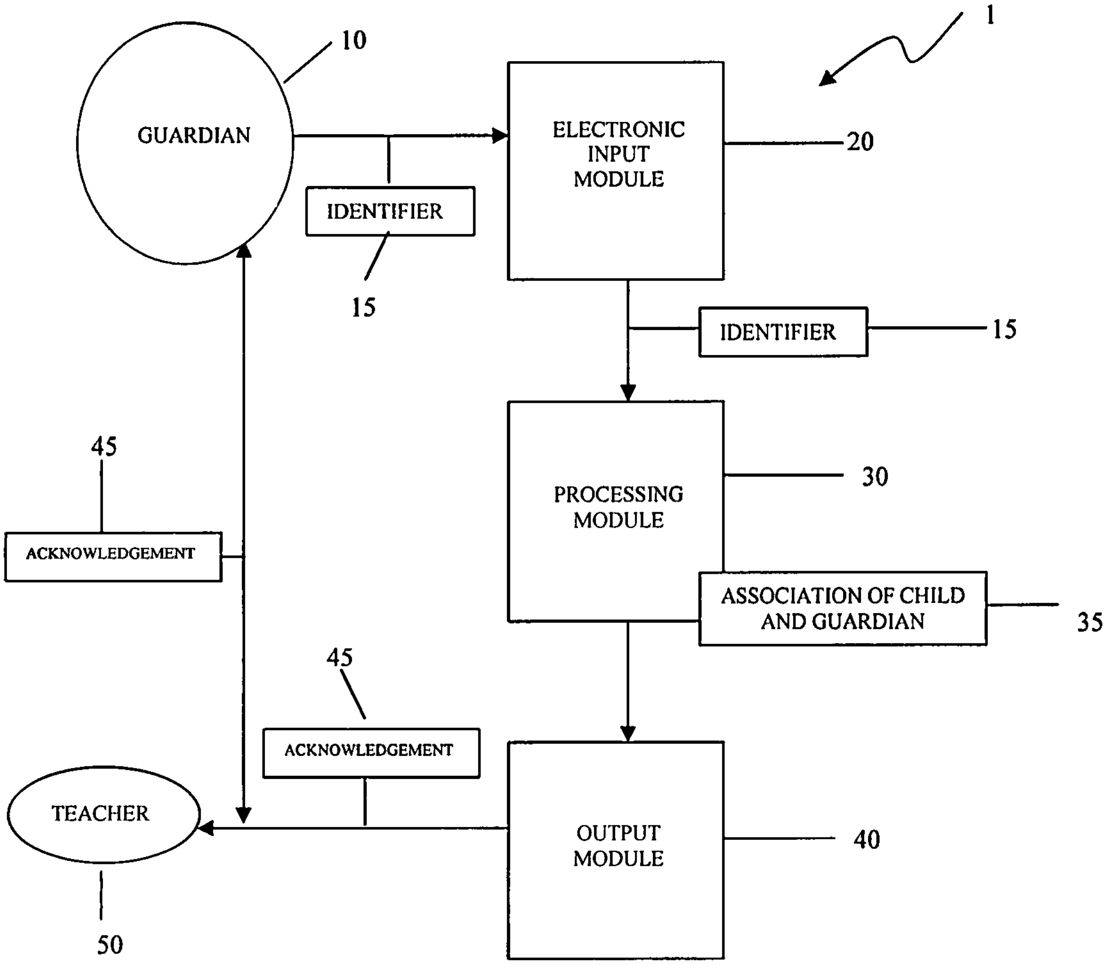
FIG. 1 is a schematic of a system for tracking custody of a child.

Referring first to FIG. 1, a system 1 for tracking custody of a child generally comprises a guardian 10, an electronic input module 20, a processing module 30, an output module 40, and a teacher 50.

The identifier 15 aids in establishing the identity of the guardian and the identifier preferably is a biometric (e.g. signature, thumbprint, DNA, eye-scan, a smart card, or a bar-code) but it may also be a series of characters or some other means of identifying the guardian. The guardian inputs the identifier into the electronic input module 20. Entry of the identifier may be accomplished with the use of a finger print scanner, an eye scanner, a touch screen, a card reader, an electronic tablet that accepts a signature or some other means. Upon entry of the identifier, the system will generally produce an attendance record to be stored on a local or remote database. The record will preferably contain a student number or name, the time and date that the identifier (e.g. biometric) was captured, and an image or electronic form of the identifier. For instance, if the identifier is a signature, the system will likely store an image file that contains the signature. Attendance records may be used for a variety of purposes including as an aid to billing and parent custody disputes. It is also contemplated that a password, unique to the child's family, may be entered into the system before the identifier is accepted.

It may also be advantageous to use the system as a communication device for communicating information to a parent. In this case, the system may require the guardian to affirmatively respond that he or she has received the message before allowing the system to continue. For instance, the system may require that the guardian accept day care charges before it prints out the acknowledgment.

The identifier 15 may be processed by the processing module 30. During such processing, the identifier is preferably verified to make sure that the guardian is authorized. In addition, the child's identity is established by matching either the identifier or the password to a database of students (children).

The output module 40 outputs an acknowledgement 45 which can be used to track a change in custody of the child. The acknowledgment may be either in a tangible form or intangible. In most cases, the acknowledgement 45 is printed either at the site where the identifier is entered or in a distal (i.e. remote or in a different location) classroom. If the acknowledgement 45 is printed at the site where the identifier is entered, the guardian preferably takes the printed acknowledgement along with her child to the child's classroom. It should be appreciated that the teacher in the child's classroom may have received a duplicate acknowledgment (or an equivalent) and would therefore be expecting the child to arrive at her classroom door. When the child arrives at the classroom, the guardian hands the acknowledgement to the teacher and the teacher accepts custody of the child. The requirement that the acknowledgment be handed to the teacher forces the teacher and the guardian to have a face-to-face encounter.

In a preferred embodiment, the input module is located at a work station near the entry to the school. This location is distal to the child's classroom and preferably the child's teacher will not open her door unless she has received notification that a child has been signed in (ie an identifier has been entered and acknowledgement has been created). By requiring the teacher to receive an acknowledgement, no child should enter a classroom without an acknowledgement being printed. In may also be preferable to require the acknowledgment to be placed into a reader at the door of the classroom in order for the classroom door to automatically open or unlock. It is further envisaged that duplicate acknowledgements can be produced whereby the guardian can keep one and the school can keep one. As noted, such acknowledgements may be various forms such as paper, electronic, or an audible message.

Figure 2:
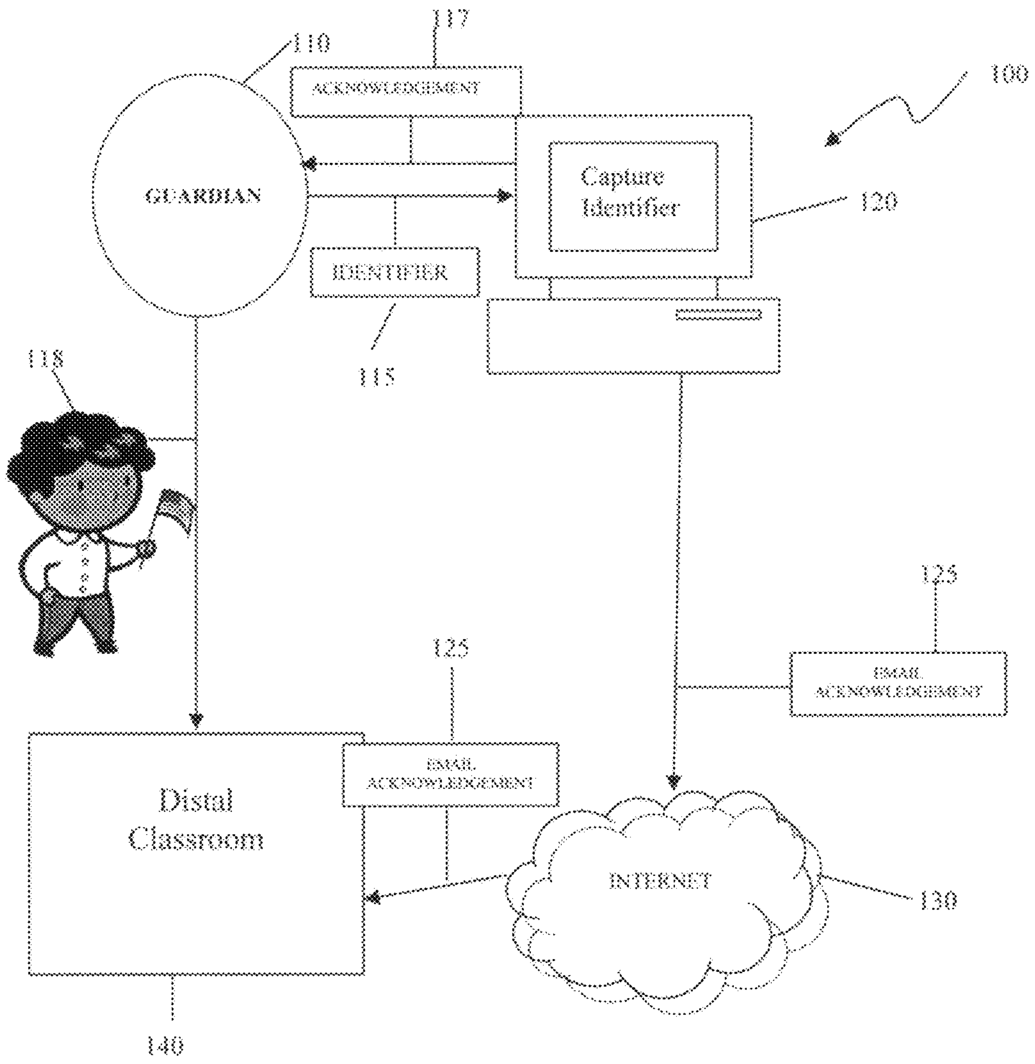
FIG. 2 is a schematic of an alternative system for tracking responsibility for a child.

Drawing your attention to FIG. 2, a system for tracking responsibility of a child 100 generally comprises a guardian 110, a device 120 for capturing an identifier 115 of the guardian 110, and teacher in a classroom 140.

One of ordinary skill in the art will appreciate that an acknowledgement verifying that the student has been signed in or out may be delivered to the guardian or to the teacher or to both. In a preferred embodiment, the acknowledgement 117 is delivered to the guardian but a duplicate or equivalent acknowledgment 125 may be transmitted (e.g. by email) through the Internet 130 to the teacher who may be in a classroom 140. Of course, the acknowledgment may be updated to a central database that is viewable by the teacher. While it is possible for the child 118 to walk directly to the classroom 140 without his or her guardian 110, if the teacher has a policy of only accepting acknowledgements 117 from the guardian 110, a face-to-face change of responsibility is forced. The importance of a face-to-face change of responsibility or custody is important because it ensures that the child was in fact delivered to, or picked up from, the teacher.

Figure 3:
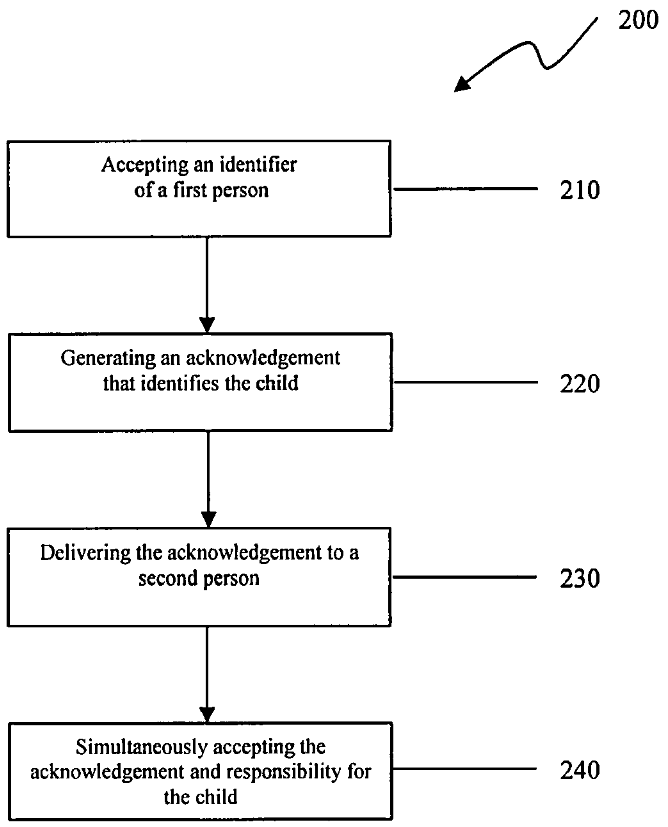
FIG. 3 is a schematic representing the steps in a method of transferring responsibility for a child.

FIG. 3 depicts steps in a method 200 of a transferring responsibility of a child. In step 210, an identifier of a person is accepted. Then, in response to the accepting of the identifier, an acknowledgement is generated that identifies the child 220. The acknowledgement is then delivered to a second person in step 230 and finally the acknowledgement and the child are simultaneously accepted in step 240. In this way, the chain of custody between the guardian and the teacher is never broken and the parent and teacher are forced to engage each other every time the child is picked-up or dropped-off. The teacher only accepts responsibility upon presentation of a valid acknowledgement by the guardian.

Figure 4:
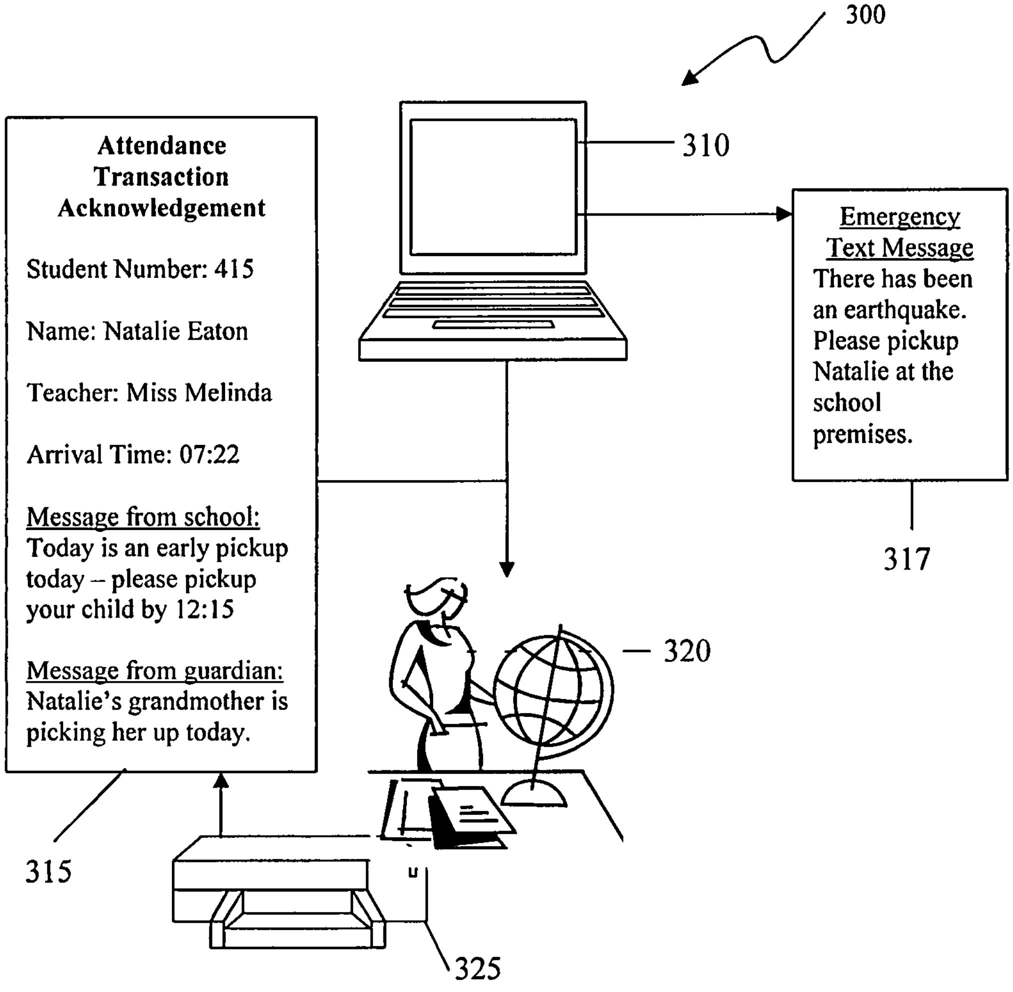
FIG. 4 is a schematic of an automated system for tracking drop-off and pick-up of a child to and from a school.

In FIG. 4, the details of an attendance transaction acknowledgment (an "acknowledgment") 315 are exemplified. Information such as the student number, student name, arrival or departure time, billing information, and multiple fields of text information may be part of the acknowledgment. The acknowledgment can also be used to advise a guardian of a late charge due to late pickup. For example, if the child should have been picked up by 6 pm but the parent arrives at 6:15, the acknowledgment is a record of the late pickup time and it can be used to calculate a late charge. Continuing this example, if the school charges a dollar per minute for late pick-up, the acknowledgment may show a late charge of $15. It should also be understood that the sign in system may communicate with the billing system in order to facilitate billing, and in that respect, a duplicate acknowledgment can be printed out in case the parent contests the late charge.

An acknowledgment may also serve as a means of documenting communication between a parent and a school administrator, teacher, or other responsible party acting on behalf of the school (collectively, the 'teacher'). For example, before the ticket is created, the guardian may be prompted to enter information that he or she wishes to communicate to the teacher. After such information is entered, the ticket can be printed along with the information. There are a variety of uses for this, including the communication of special dietary instructions or medicinal requirements or other issues that the guardian wants the teacher to be aware of.

Another aspect of the present invention is the capability to send a rapid notification 317 to the guardian(s) of every student checked into school or even a subset of all of the students. This can be especially useful if an emergency situation arises such as an earthquake, a tornado, or a blizzard.

The teacher 320 may print out the acknowledgment 315 on her printer 325 and she may turn this into the school administration. Alternatively, the teacher may have received an electronic acknowledgement that is also stored for purposes of maintaining the school records.

Thus, specific embodiments and applications of the inventive concept have been disclosed. It should be apparent, however, to those skilled in the art that many more modifications besides those already described are possible without departing from the inventive concepts herein. The inventive subject matter, therefore, is not to be restricted. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A system for tracking a change of custody of a child attending a school having a sign-in location and a secured location remote from the sign-in location for holding or receiving the child, comprising:

an input device positioned at the sign-in location and configured to accept an identifier of a guardian;

a processor coupled to the input device and configured to:

associate the child and the guardian based on the identifier of the guardian, and generate a first acknowledgement upon association of the child and the guardian;

a first printer positioned at the sign-in location and configured to print the first acknowledgement; and a second printer positioned at the secured location and configured to print a second acknowledgement having similar information as the first acknowledgement; and a reader device positioned at the secured location and configured to detect the first acknowledgement and to control access to the secured location based on the first acknowledgement, such that the change of custody of the child takes place only after the first acknowledgement is accepted by the reader device at the secured location.

2. The system of claim 1, wherein the identifier comprises a biometric and the processor is configured to generate an attendance record including an electronic copy of the biometric.

3. The system of claim 2, further including a memory coupled to the processor and configured to store the attendance record.

4. The system of claim 1, wherein the first acknowledgement is a paper ticket comprising the child's name.

5. The system of claim 1, wherein the processor is further configured to generate an electronic copy of the first acknowledgement that is transmitted to a computer located at the secured location.

6. The system of claim 1, wherein the first acknowledgement comprises at least one of a medical instruction, a dietary instruction, or a safety instruction.

7. The system of claim 1, wherein the first acknowledgment comprises a safety instruction concerning a child custody issue.

8. A system for tracking responsibility of a child attending a school having an entrance and a secured location remote from the entrance for receiving the child, comprising:

an input device positioned at the entrance and configured to receive an identifier of a guardian relinquishing responsibility of the child;

a processor coupled to the input device and configured to generate an acknowledgement upon receiving the identifier;

a first printer positioned at the entrance and configured to print the acknowledgement; and a second printer positioned at the secured location and configured to print a copy of the acknowledgement, at which point a person is permitted to assume responsibility of the child on behalf of the school only after receiving the acknowledgement.

9. The system of claim 8, wherein the identifier is a signature.

10. The system of claim 8, wherein the identifier is a finger print.

11. The system of claim 8, wherein the processor is further configured to generate an e-mail copy of the acknowledgement.

12. The system of claim 8, wherein the processor is further configured to generate a text message including similar information as the acknowledgement.

13. The system of claim 8, further comprising a family authorization code.

14. The system of claim 8, wherein the acknowledgement comprises at least one of a child name, a time of day, or a student number.

15. The system of claim 8, wherein the acknowledgement comprises informational text entered by the person who relinquishes responsibility.

16. The system of claim 8, wherein the acknowledgement comprises informational text in the form of dietary, medical, or custodial information concerning the child.

17. A method of transferring responsibility of a child, comprising the steps of:

accepting, using an input device positioned at a first location, an identifier of a first person;

generating, using a processor, a first acknowledgment that identifies the child;

printing, by a first printer positioned at the first location, the first acknowledgement; and printing, by a second printer positioned at a second location remote from the first location, a second acknowledgement that includes similar information as the first acknowledgement such that the second acknowledgement can be received by a second person, wherein the responsibility of the child is transferred to the second person only after the second person receives the second acknowledgement at the second location.

18. The method of claim 17, further comprising a step of simultaneously accepting the second acknowledgement and accepting responsibility for the child.

19. The method of claim 17, further comprising a step of verifying identity of the first person.

20. The method of claim 17, wherein the first acknowledgement is generated after the first person's identifier is verified.

21. An automated system for tracking drop-off and pick-up of a child to and from a school having a first location and a second location remote from the first location, comprising:

a device positioned at the first location and configured to accept an identifier of a guardian dropping-off or picking-up the child;

a processor coupled to the device, and configured to generate an acknowledgement based on the identifier of the guardian at the first location;

a first printer positioned at the first location and configured to print the acknowledgement; and a second printer positioned at the second location and configured to print a copy of the acknowledgement such that it may be received by a person accepting responsibility for the child on behalf of the school at the second location, such that the person is permitted to receive or release custody of the child only after receiving the copy of the acknowledgement at the second location.

22. The system of claim 21, wherein the processor is further configured to generate an electronic communication including similar information as the acknowledgement and the electronic communication is delivered to a computer controlled by the person accepting responsibility for the child.

23. The system of claim 21, wherein the acknowledgement comprises information identifying the child.

24. The system of claim 21, wherein the acknowledgement comprises a time that the identifier was accepted.

25. The system of claim 21, wherein the identifier is a signature of the person delivering or picking-up the child.

26. The system of claim 21, wherein the device is a computer that captures an electronic signature entered on a tablet.

27. The system of claim 21, further comprising a face-to-face exchange of responsibility between the guardian and the person accepting responsibility.

28. The system of claim 21, wherein the processor is further configured to generate an emergency instruction that is automatically delivered to the guardian upon the occurrence of an emergency event.

* * * * *